United States Patent

Kawasaki et al.

[11] Patent Number: 5,819,118
[45] Date of Patent: Oct. 6, 1998

[54] DRIP-PROOF MECHANISM IN APPARATUS

[75] Inventors: Toyotoshi Kawasaki, Kawachinagano; Kenichi Murakami, Takatsuki, both of Japan

[73] Assignee: Minolta Co., Ltd., Osaka, Japan

[21] Appl. No.: 747,818

[22] Filed: Nov. 13, 1996

[30] Foreign Application Priority Data

Nov. 14, 1995 [JP] Japan .................................. 7-295206

[51] Int. Cl.⁶ .................................................. G03B 17/08
[52] U.S. Cl. ............................................. 396/29; 359/513
[58] Field of Search ................................. 396/25, 26, 27, 396/28, 29, 72, 529, 530, 531, 532, 533; 359/508, 513, 507, 819, 822, 823, 824; 348/81

[56] References Cited

U.S. PATENT DOCUMENTS

| | | | |
|---|---|---|---|
| 4,281,837 | 8/1981 | Hashimoto | 396/29 |
| 4,372,664 | 2/1983 | Shimizu | 396/25 |
| 5,056,903 | 10/1991 | Nakamura et al. | 359/513 |
| 5,305,145 | 4/1994 | Tanaka | 359/513 |
| 5,374,970 | 12/1994 | Satoh et al. | 396/29 |

*Primary Examiner*—A. A. Mathews
*Attorney, Agent, or Firm*—McDermott, Will & Emery

[57] ABSTRACT

A drip-proof mechanism in an apparatus which is operated by moving an operation member relative to a member that is adjacent to the operation member. The operation member includes a main unit which is substantially cylindrical shaped and rotatable with respect to the adjacent member, and an elastic member which covers the outer surface of the main unit. On each circumference of the elastic member, extensions are formed as a unit at both ends of said the operation member, and each extensions is elastically pressed against the adjacent member when the operation member is assembled with the adjacent member to prevent drip.

11 Claims, 3 Drawing Sheets

FIG. 3 (II)

FIG. 4 (III)

DRIP-PROOF MECHANISM IN APPARATUS

BACKGROUND OF THE INVENTION

1. Field of the Invention

The present invention pertains to a drip-proof mechanism that seals the area between the movable member and the fixed member of an apparatus, and more particularly, to a drip-proof mechanism suited for camera lens mounts.

2. Description of the Related Art

So-called water-resistant cameras have conventionally been proposed, that are equipped with a drip-proof mechanism such that they may be used in an environment where they may be exposed to slight splashes and rain drops. Such a drip-proof mechanism prevents liquid such as water from entering the interior of the camera in a situation in which no water pressure is exerted on it, and is different from a water-proof mechanism that prevents water, etc. from entering the interior even under water pressure as when the camera is completely under water.

Such a drip-proof mechanism comprises a rubber packing or an O-ring. For example, as shown in FIG. 1, it is designed with grooves 2a and 4a formed facing gap 6 between two members 2 and 4, such that a sealing member, i.e., O-ring 8, will be sandwiched by grooves 2a and 4a. However, since O-ring 8 is generally used for the sealing of static members, if one member 2 rotates relative to the other member 4, special design considerations, such as moving the sealing points of members 2 and 4 closer to the rotational axis to reduce the relative amount of slipping, is necessary. In other words, a drip-proof mechanism for an area in which a moving member moves relative to a fixed member is generally designed such that a separate member, such as O-ring 8, is used for the border area between the two members. This makes the design complex and also increases the manufacturing cost.

SUMMARY OF THE INVENTION

The object of the present invention is to provide a drip-proof mechanism that can seal the gap between two members using a simple design.

Another object of the present invention is to reduce the manufacturing cost of the drip-proof mechanism which seals the gap between two members.

These and other objects of the present invention are attained by a drip-proof mechanism used in apparatuses which are operated by moving an operation member relative to a member that is adjacent to said operation member, said drip-proof mechanism comprising the main unit of said operation member; an elastic member which covers the outer surface of said operation member main unit; and, extensions which are formed on the circumference of the elastic member as if they were one unit, and which elastically become pressed against the adjacent member when the operation member is assembled with the adjacent member.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 3(I) shows the configuration in the natural state; and FIG. 3(II) shows the configuration after assembly.

FIG. 4(I) shows the configuration in the natural state; FIG. 4(II) shows the configuration after assembly; and FIG. 4(III) shows another example of the configuration after assembly.

DETAILED DESCRIPTION OF THE PREFERRED EMBODIMENTS

The drip-proof mechanisms in operative apparatuses pertaining to the embodiments of the present invention shown in FIGS. 2 through 7 are explained below in detail.

First, one embodiment of the present invention will be explained with reference to FIGS. 2 through 6.

Figure 1:
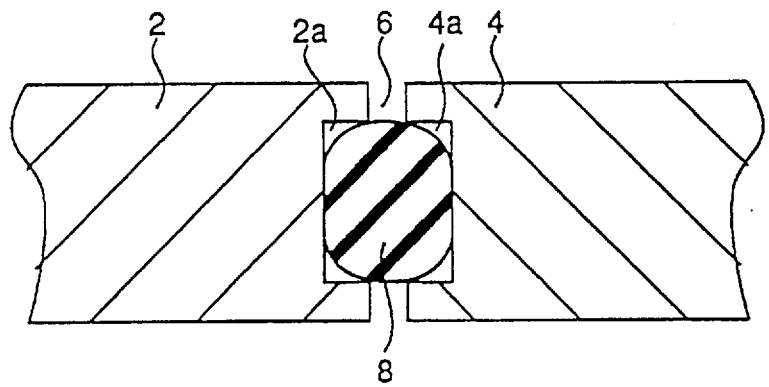
FIG. 1 is a cross-sectional view of a main part of a conventional drip-proof mechanism.
Figure 2:
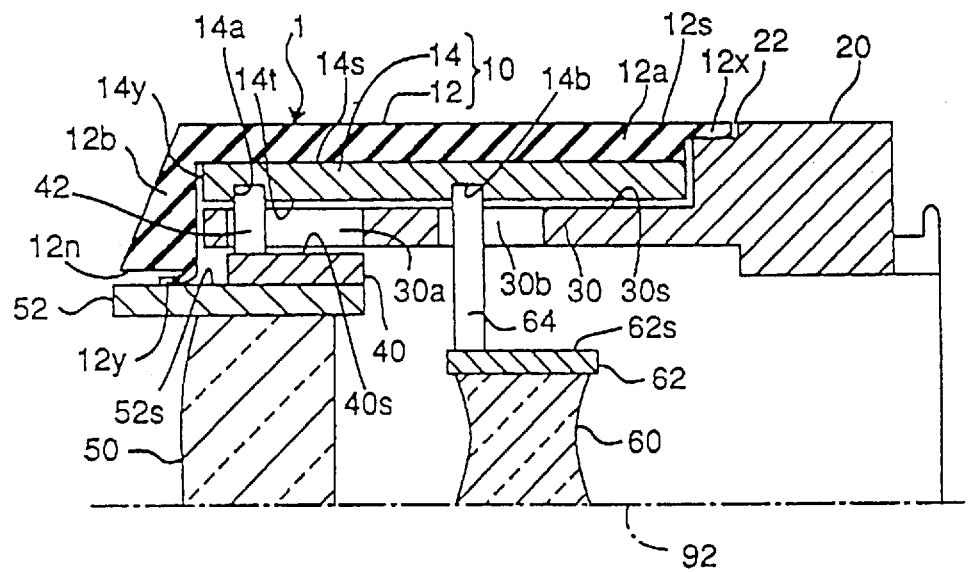
FIG. 2 is a cross-sectional view of a main part of a lens mount in which the drip-proof mechanism pertaining to one embodiment of the present invention is applied.

In this embodiment, the present invention is applied in camera zoom lens mount 1. As shown in FIG. 2 showing a cross-sectional view of half of lens mount 1 cut along center line 92, zoom lens mount 1 has essentially the same design as a conventional model. It is basically equipped with lens mount main unit 20, which is a fixed member, outer cylinder 10, which is an operation member, first lens unit 50 and second lens unit 60. Straight movement guiding cylinder 30 is formed in front of lens mount main unit 20, and outer cylinder 10 including cam ring 14, is engaged with outer surface 30s of straight movement guiding cylinder 30.

First and second straight movement guiding grooves 30a and 30b, which extend along the optical axis and pierce through straight movement guiding cylinder 30, are formed on said cylinder. First and second cam grooves 14a and 14b, having a prescribed configuration which is essentially spiral, are formed over inner surface 14t of cam ring 14, and rubber ring 12 made of an elastic member is tightly placed over outer surface 14s of cam ring 14. Cam ring 14 and rubber ring 12 form outer cylinder 10 together, and rotate together relative to straight movement guiding cylinder 30.

First lens unit 50 supported by first lens unit holder 52, second lens unit 60 supported by second lens unit holder 62 and moving cylinder 40, which supports first lens unit holder 52, are housed inside straight movement guiding cylinder 30. First lens unit holder 52 is moved along the optical axis relative to moving cylinder 40 by means of a motor not shown in the drawing, such that focus adjustment may be made. First and second engaging pins 42 and 64, which extend outward from the center of the lens mount, protrude from outer surfaces 40s and 62s of moving cylinder 40 and second lens unit holder 62, respectively.

First and second engaging pins 42 and 64 respectively engage with first and second cam grooves 14a and 14b of cam ring 14 via first and second straight movement guiding grooves 30a and 30b of straight movement guiding cylinder 30. When outer cylinder 10, or cam ring 14, is moved relative to straight movement guiding cylinder 30, first and second cam grooves 14a and 14b of cam ring 14 come to intersect first and second straight movement guiding grooves 30*a* and 30*b* of straight movement guiding cylinder 30 at different points, respectively. Consequently, first lens unit 50 and second lens unit 60 move along the optical axis.

Rubber ring 12 has cylindrical member 12*a* which covers outer surface 14*s* of cam ring 14 and donut-shaped flange 12*b* which extends toward the center of the lens mount such that it covers front end 14*y* of cam ring 14. Unlike the conventional zoom lens mount, rear extension 12*x* is formed at the rear end of cylindrical member 12*a* of rubber ring 12, and front extension 12*y* is formed on inner surface 12*n* of flange 12*b*.

Figure 3:
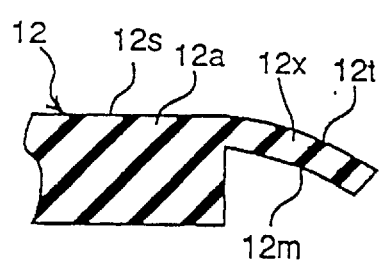
FIG. 3 is an enlargement of an important area of FIG. 2.

Rear extension 12*x* of rubber ring 12 is formed entirely along the circumference of cylindrical member 12*a*, or in a 360° range. Its thickness is smaller than the thickness of cylindrical member 12*a*, as shown in FIGS. 2 and 3. Step 22, which accommodates this rear extension 12*x*, is formed on lens mount main unit 20 in response to rear extension 12*x* of rubber ring 12, such that outer surfaces 12*s* and 12*t* of cylindrical member 12*a* and rear extension 12*x* of rubber ring 12, respectively, and outer surface 20*s* of lens mount main unit 20 may be contained in substantially the same plane. In the natural state, rear extension 12*x* of rubber ring 12 extends toward the center of the lens mount, or in other words, curving inward such that it will be closer to the center of the lens mount than outer surface 22*s* of step 22 of lens mount main unit 20, as shown in FIG. 3(I). When rubber ring 12 is forcibly placed over cam ring 14 and lens mount 1 is assembled, rear extension 12*x* of rubber ring 12 becomes forced by outer surface 22*s* of step 22 of lens mount main unit 20, as shown in FIG. 3(II), and elastically deformed outward from the center of the lens mount, whereby it assumes a straight configuration. Because of this, inner surface 12*m* of rear extension 12*x* of rubber ring 12 tightly adheres to outer surface 22*s* of step 22 of lens mount main unit 20 based on the elastic recovery ability of rear extension 12*x*, which causes rear extension 12*x* to move back toward the center of the lens mount, and functions as a seal to prevent water, etc. from entering lens mount interior 28.

Figure 4:
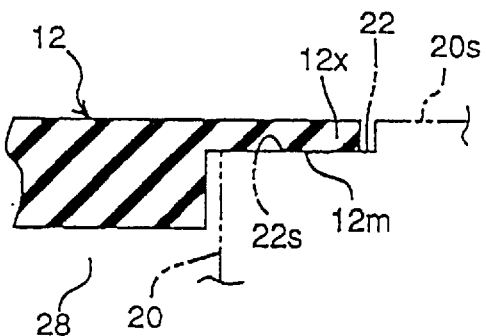
FIG. 4 is an enlargement of an important area of FIG. 2.
Figure 4:
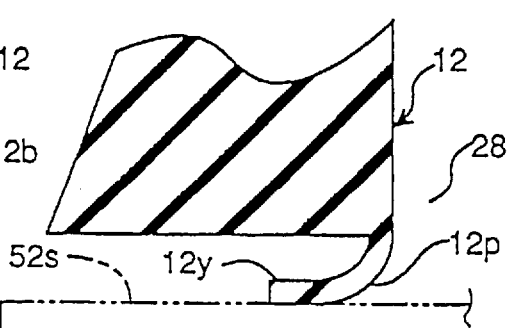
Figure 4:
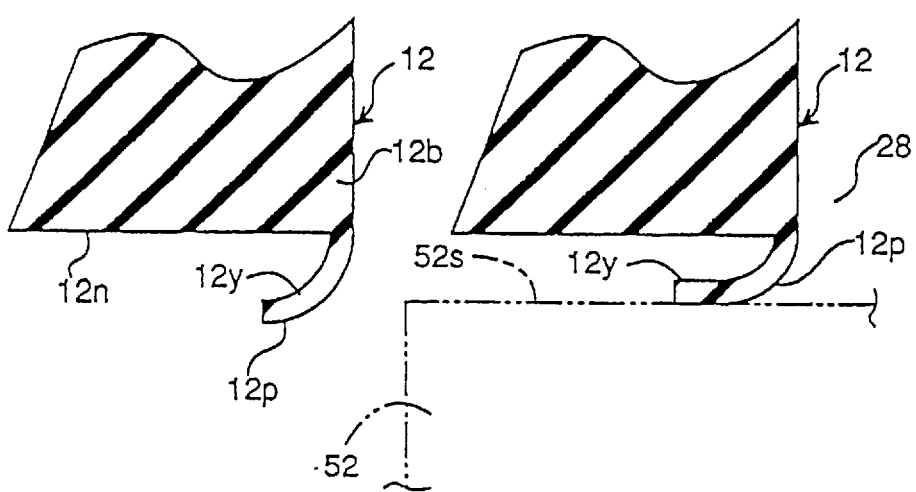

Front extension 12*y* formed on inner surface 12*n* of flange 12*b* of rubber ring 12 has a cross-sectional configuration like a hook, and extends all around inner surface 12*n*, in a 360° range. In the natural state, front extension 12*y* extends toward the center of the lens mount, such that it will be closer to the center of the lens mount than outer surface 52*s* of first lens unit holder 52, as shown in FIG. 4(I). When zoom lens mount 1 is assembled, as shown in FIG. 4(II), front extension 12*y* becomes forced by outer surface 52*s* of first lens unit holder 52 and becomes elastically deformed, curving outward from the center of the lens mount. Because of this, inner surface 12*p* of front extension 12*y* of rubber ring 12 tightly adheres to outer surface 52*s* of first lens unit holder 52, based on the elastic recovery ability of front extension 12*y* toward the center of the lens mount, and functions as a seal in the same manner as rear extension 12*x*. In this case, extension 12*y* pushes out dust and particles that have been deposited on outer surface 52*s*, providing a dust-proof effect as well as a drip-proof effect. Using this design, the extensions of rubber ring 12 extend all around the operation member, and if the substantially cylindrical operation member rotates relative to its adjacent member, the extensions function as seals regardless of how much the operation member rotates. In addition, because the rubber ring extensions exist on either end of the operation member, drip-proof mechanisms are obtained at either end of the operation member, i.e., in front and in the back of the operation ring in a zoom lens mount, for example.

In case that extension 12*y* which is formed on inner surface 12*n* is turned backward in the manner shown in FIG. 4(III), when lens mount interior 28 becomes lower in pressure than the exterior environment of lens mount 1, the force exerted on extension 12*y* of rubber ring 12 becomes mitigated by air pressure, and extension 12*y* works as a valve that allows air to enter lens mount interior 28. In this case, there may be a concern about the reduction in drip-proof effect caused by the entry of air. However, since, when the pressure of lens mount interior 28 becomes lower, first lens mount holder 52 is moved forward and drips deposited on outer surface 52*s* are also pushed forward. Therefore, the drip-proof effect may be maintained. However, in this case, since dust and particles deposited on outer surface 52*s* of first lens unit holder 52 become sandwiched between extension 12*y* of rubber ring 12 and outer surface 52*s* of first lens unit holder 52, dust-proof effect may not be obtained.

In the design described above, when outer cylinder 10 rotates relative to lens mount main unit 20, front and rear extensions 12*x* and 12*y* of rubber ring 12 move on outer surface 22*s* of step 22 of lens mount main unit 20 and outer surface 52*s* of first lens unit holder 52, respectively, while maintaining the sealing effect. When this takes place, because extensions 12*x* and 12*y* of rubber ring 12 are thinner than cylindrical member 12*a* or flange 12*b* of rubber ring 12, they do not adhere to lens mount main unit 20 or first lens unit 52 with force greater than necessary, and therefore the force required to operate outer cylinder 10 does not increase.

Therefore, in the embodiment described above, a drip-proof mechanism may be obtained using a simple design in which extensions 12*x* and 12*y* are formed on either end of rubber ring 12, which is used as part of operation member 10, without an increase in the number of components.

In addition, in the design described above, since lens mount interior 28 is closed air-tight, there is a case where the pressure of lens mount interior 28 increases and becomes higher than the external pressure due to the collapsing of lens mount 1 via zooming operation, or due to an increase in temperature of lens mount interior 28. Such a situation is not desirable.

Figure 5:
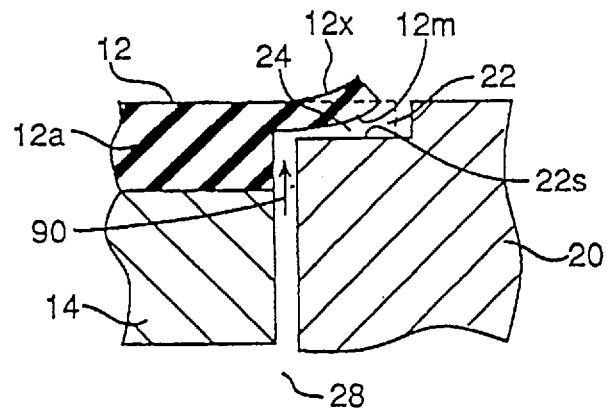
FIG. 5 is an enlargement of an important area of FIG. 2, when the pressure inside the lens mount has increased.

In this embodiment, the pressure of lens mount interior 28 is automatically adjusted. In other words, when the pressure of lens mount interior 28 increases, rear extension 12*x* is pushed by air inside lens mount interior 28 and curves outward from the center of the lens mount, as shown in FIG. 5. Inner surface 12*m* of rear extension 12*x* separates from outer surface 22*s* of step 22 of lens mount main unit 20, and the air inside lens mount interior 28 escapes from gap 24 created between inner surface 12*m* and outer surface 22*s*. When this happens, since the air flows from lens mount interior 28 to the outside, as indicted by arrow 90, water, etc. are prevented from entering lens mount interior 28 through this gap 24 from the outside.

When the pressure of lens mount interior 28 becomes approximately the same as the external pressure, rear extension 12*x* recovers the original configuration based on its elastic recovery ability and tightly adheres to outer surface 22*s* of step 22 of lens mount main unit 20. Therefore, rear extension 12*x* of rubber ring 12 has a function as a relief valve, allowing the pressure of lens mount interior 28 to escape while maintaining a drip-proof function.

Similarly, front extension 12*y* of rubber ring 12 also has a function as a relief valve. In other words, because front extension 12*y* is J-shaped outward from the apparatus, when the pressure of lens mount interior 28 increases, the part that is in contact with outer surface 52*s* of first lens unit holder 52 moves forward, allowing the pressure to escape. On the other hand, when the pressure of lens mount interior 28 becomes smaller than the external pressure, since front extension 12y does not easily move backward because of its configuration, the air-tight contact between front extension 12y and outer surface 52s of first lens unit holder 52 is usually maintained.

Figure 6:
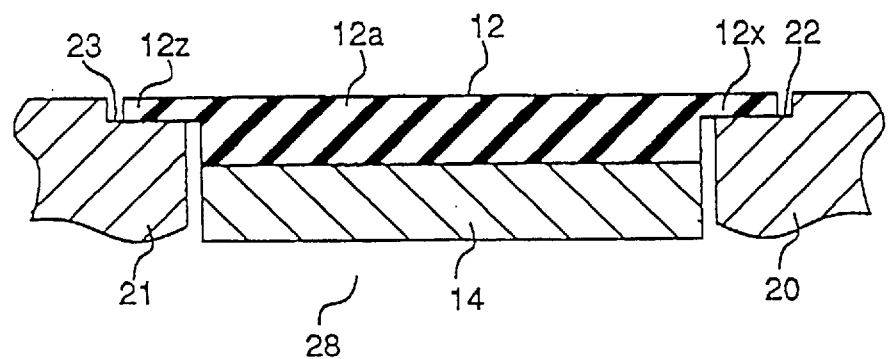
FIG. 6 is a cross-sectional view of a main part of a modified version of the drip-proof mechanism pertaining to one embodiment of the present invention.

While front and rear extensions of rubber ring 12 are different from each other in terms of configuration in the embodiment described above, if rubber ring 12 does not have flange 12b, as in the modified version shown in FIG. 6, it is possible to use a design in which front extension 12z, which is designed in the same way as rear extension 12x, is formed at the front end of cylindrical member 12a of rubber ring 12 as well, and step 23 is formed on front member 21 of lens mount 1, in the same way as step 22 of lens mount main unit 20, to meet front extension 12z.

Figure 7:
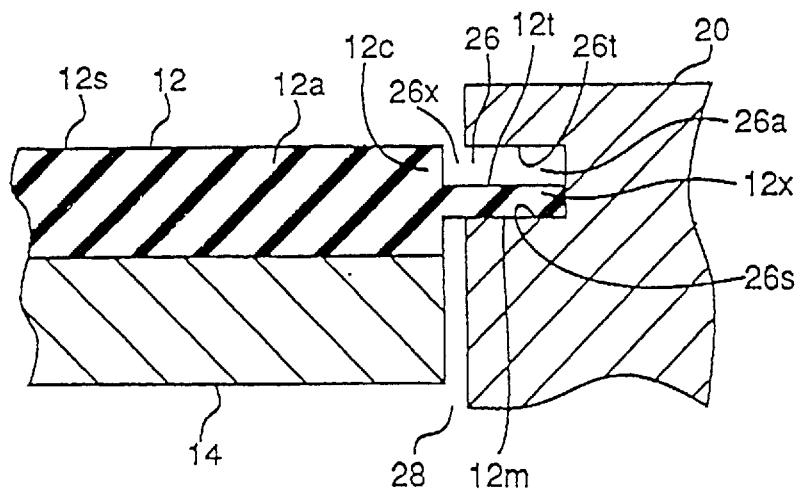
FIG. 7 is a cross-sectional view of a main part of a drip-proof mechanism pertaining to another embodiment of the present invention.

Another embodiment with an increased drip-proof effect will now be explained with reference to the cross-sectional view of an important area shown in FIG. 7. Since this embodiment has generally the same design as the embodiment described above, the explanation will focus on differences.

On lens mount main unit 20 is formed groove 26, which creates donut-shaped space 26a, in place of step 22, to accommodate rear extension 12x of rubber ring 12, such that rear extension 12x of rubber ring 12 may be inserted in this groove 26. Rear extension 12x is formed in the same way as in the embodiment described above, such that it will extend inward toward the center of the lens mount, or in other words, such that it will curve to be closer to the center of the lens mount than inner groove surface 26s of groove 26 in the natural state. After assembly, inner surface 12m of rear extension 12x tightly adheres to inner groove surface 26s of groove 26, and outer surface 12t of rear extension 12x faces outer groove surface 26t of groove 26 with some space in between. Extension 12x of rubber ring 12 is formed at a position away from outer surface 12s of cylindrical member 12a of rubber ring 12 toward the center of said member, such that step-like shoulder 12c will be formed at the rear end of cylindrical member 12a of rubber ring 12. This shoulder 12c is designed such that it will substantially cover opening 26x of groove 26.

In the embodiment described above, the sealing area, i.e., the air-tight contact area between inner surface 12m of extension 12x of rubber ring 12 and inner groove surface 26s of groove 26 of lens mount main unit 20 is not exposed outside the apparatus. Consequently, water, etc. do not reach the sealing area unless they enter groove 26. Namely, water, etc. cannot directly reach the sealing area from outside lens mount 1, which increases the drip-proof effect. Normally, operation member 10 would become difficult to move when rear extension 12x of elastic member 12, which is a part of operation member 10, would be held and the force and torque required to operate operation member 10 would increase. However, because the sealing area is not exposed, this inconvenience does not occur. Moreover, since extension 12x of elastic member 12 of operation member 10 is protected in groove 26 and is largely unaffected by external force, it does not easily become damaged.

The present invention is not limited to the embodiments described above, but may be implemented in various other forms. For example, it may be designed such that the outer surface of the extension of rubber ring 12 will curve outward from the center of the lens mount in the natural state and the outer surface of said extension will tightly adhere to a part of the lens mount.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A drip-proof mechanism used in an apparatus which is operated by rotating an operation member relative to an adjacent member which is adjacent to said operation member to move the adjacent member in the rotational axis direction, said drip-proof mechanism comprising:

a main unit of the operation member;

an elastic member which covers the outer surface of said main unit and has a inner surface extending in the rotational axis direction and being parallel to an outer surface of the adjacent member; and an extension which is formed on a circumference of the elastic member as a unit, said extension being elastically deformed between the inner surface of the elastic member and the outer surface of the adjacent member and being elastically pressed against the outer surface the adjacent member when the operation member is assembled with the adjacent member.

2. The drip-proof mechanism as claimed in claim 1, wherein said operation member is substantially cylindrical shaped and rotatable with respect to the adjacent member, and said extension is extendedly provided entirely along the circumference at an end of the operation member.

3. The drip-proof mechanism as claimed in claim 2 further comprising another extension which is provided on another end of said operation member entirely along the circumference.

4. The drip-proof mechanism as claimed in claim 2, wherein said adjacent member has a groove into which said extension is inserted, and a surface of the groove contacts and presses the extension.

5. The drip-proof mechanism as claimed in claim 4, wherein an opening of the groove is substantially covered with the operation member.

6. The drip-proof mechanism as claimed in claim 1, wherein said extension is arranged to elastically deform and separate from the adjacent member for releasing the pressure inside the operation member, when the pressure inside the operation member is higher than the pressure outside the operation member, while said extension is arranged to retain in pressure contact with the adjacent member, when the pressure inside the operation member is not higher than the pressure outside the operation member.

7. The drip-proof mechanism as claimed in claim 1, wherein said extension is arranged step-like with respect to the elastic member so that a thickness of said extension is less than that of said elastic member.

8. An apparatus which is operated by moving an operation member relative to an adjacent member that is adjacent to said operation member, the operation member comprising:

a main unit which is substantially cylindrical shaped and rotatable with respect to the adjacent member;

an elastic member which covers the outer surface of said main unit; and extensions which are formed on circumferences of the elastic member as a unit on both ends of the operation member, each said extensions being elastically pressed against the adjacent member when the operation member is assembled with the adjacent member.

9. The apparatus as claimed in claim 8, wherein the thickness of each extensions is less than the thickness of said elastic member.

10. The apparatus as claimed in claim 9, wherein the adjacent member has a groove into which one of said extensions is inserted so that a surface of the groove contacts and presses the extension.

11. A drip-proof mechanism used in a camera lens which is operated by rotating an operation ring relative to a lens cylinder which is adjacent to said operation ring to move the lens cylinder in the rotational axis direction, said drip-proof mechanism comprising:

an elastic member which covers the outer surface of said operation ring; and an extension which is formed on a circumference of the elastic member as a unit, said extension curving from the outside to the inside of the camera lens and being elastically pressed against the outer surface of the lens cylinder when the operation ring is assembled with the lens cylinder.

\* \* \* \* \*